(12) United States Patent
Madhav et al.

(10) Patent No.: US 9,922,126 B2
(45) Date of Patent: Mar. 20, 2018

(54) SYSTEM AND METHOD FOR INFORMATION TECHNOLOGY INFRASTRUCTURE TRANSFORMATION

(71) Applicants: Sriram Bhargav Madhav, Bangalore (IN); Adarsh Hassan Devendraswamy, Bangalore (IN); Arijit Dey, Bangalore (IN)

(72) Inventors: Sriram Bhargav Madhav, Bangalore (IN); Adarsh Hassan Devendraswamy, Bangalore (IN); Arijit Dey, Bangalore (IN)

(73) Assignee: WIPRRO LIMITED, Bangalore (IN)

( * ) Notice: Subject to any disclaimer, the term of this patent is extended or adjusted under 35 U.S.C. 154(b) by 316 days.

(21) Appl. No.: 14/788,649

(22) Filed: Jun. 30, 2015

(65) Prior Publication Data
US 2016/0337207 A1     Nov. 17, 2016

(30) Foreign Application Priority Data
May 11, 2015 (IN) .......................... 2404/CHE/2015

(51) Int. Cl.
*G06F 7/00* (2006.01)
*G06F 17/30* (2006.01)
*H04L 12/24* (2006.01)

(52) U.S. Cl.
CPC ........ *G06F 17/30876* (2013.01); *H04L 41/12* (2013.01)

(58) Field of Classification Search
CPC ... G06F 17/30; G06F 17/30876; H04L 41/12; H04L 41/50; G06Q 10/04; G06Q 10/06; G06Q 10/063
See application file for complete search history.

(56) References Cited

U.S. PATENT DOCUMENTS

| 2004/0193476 | A1* | 9/2004 | Aerdts | G06Q 30/0201 705/7.29 |
| 2007/0061191 | A1* | 3/2007 | Mehrotra | G06Q 10/06 705/7.36 |
| 2008/0115110 | A1* | 5/2008 | Fliek | G06F 11/3672 717/125 |
| 2013/0254735 | A1* | 9/2013 | Sakhardande | G06F 8/77 717/100 |

* cited by examiner

*Primary Examiner* — Azam M Cheema
(74) *Attorney, Agent, or Firm* — Finnegan, Henderson, Farabow, Garrett & Dunner, LLP

(57) ABSTRACT

This disclosure relates generally to information technology (IT), and more particularly to a system and method for IT infrastructure transformation. In some embodiments, information related to an IT infrastructure is gathered, a current maturity level of the IT infrastructure is assessed using an analytical maturity model, and a transformation roadmap is derived to achieve a desired maturity level of the IT infrastructure based on the current maturity level and the information gathered. In some embodiments, the analytical maturity model is configured to provide maturity ratings based on the information gathered and industry standard.

18 Claims, 4 Drawing Sheets

SYSTEM AND METHOD FOR INFORMATION TECHNOLOGY INFRASTRUCTURE TRANSFORMATION

CROSS-REFERENCE TO RELATED APPLICATIONS

This U.S. patent application claims the benefit of priority under 35 U.S.C. § 119 to India Patent Application No. 2404/CHE/2015, filed on May 11, 2015. The aforementioned application is incorporated herein by reference in its entirety.

DESCRIPTION

Technical Field

This disclosure relates generally to Information Technology (IT) management, and more particularly to a system and method for IT infrastructure transformation.

Background

In the current business environment, efficient and cost effective IT infrastructure transformation is one of the key factors in the success of many enterprises. An organization needs to transform their IT infrastructure from time to time in response to changing business needs and to meet the demands of industry growth. For example, IT Infrastructure space today is witnessing a major shift due to technologies such as social, mobility, analytics and cloud opening up newer business channels thereby creating a need for "Change the Business" type of IT spends. In addition, there is also a need to continuously optimize "Run the Business" type of IT spends.

However, the existing IT environments are becoming increasingly complex, thereby inhibiting the ability to respond rapidly while curtailing cost. Further, one must factor in existing state of applications & infrastructure, constraints due to legacy systems, areas urgently needing modernization, or cost-benefit analysis of replacing older systems. The existence of a wide variety of IT products and solutions in the market further makes the decision making a daunting task. All these may lead to questions such as— which parts of IT should be optimized, where the new IT investments should be made, what should be the IT transformation roadmap, and so forth. Current techniques providing IT transformation roadmap are manual, time consuming, or provide vendor specific i.e., non-agnostic recommendations.

It is therefore desirable to provide a technique for IT transformation that would address the above issues. It is also desirable to provide for a methodical approach to analyze IT infrastructure from various viewpoints and provide a holistic roadmap to chief experience officers (CXO's), business users and technology architects so as to transform the IT infrastructure suitable for diverse as well as future business needs.

SUMMARY

In one embodiment, a method for transforming an information technology (IT) infrastructure is disclosed. In one example, the method comprises gathering information related to the IT infrastructure. The method further comprises assessing a current maturity level of the IT infrastructure using an analytical maturity model. The analytical maturity model is configured to provide maturity ratings based on the information gathered and industry standard. The method further comprises deriving a transformation roadmap to achieve a desired maturity level of the IT infrastructure based on the current maturity level and the information gathered.

In one embodiment, a system for transforming an IT infrastructure is disclosed. In one example, the system comprises at least one processor and a memory communicatively coupled to the at least one processor. The memory stores processor-executable instructions, which, on execution, cause the processor to gather information related to the IT infrastructure. The processor-executable instructions, on execution, further cause the processor to assess a current maturity level of the IT infrastructure using an analytical maturity model. The analytical maturity model is configured to provide maturity ratings based on the information gathered and industry standard. The processor-executable instructions, on execution, further cause the processor to derive a transformation roadmap to achieve a desired maturity level of the IT infrastructure based on the current maturity level and the information gathered.

In one embodiment, a non-transitory computer-readable medium storing computer-executable instructions for transforming an IT infrastructure is disclosed. In one example, the stored instructions, when executed by a processor, cause the processor to perform operations comprising gathering information related to the IT infrastructure. The operations further comprise assessing a current maturity level of the IT infrastructure using an analytical maturity model. The analytical maturity model is configured to provide maturity ratings based on the information gathered and industry standard. The operations further comprise deriving a transformation roadmap to achieve a desired maturity level of the IT infrastructure based on the current maturity level and the information gathered.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
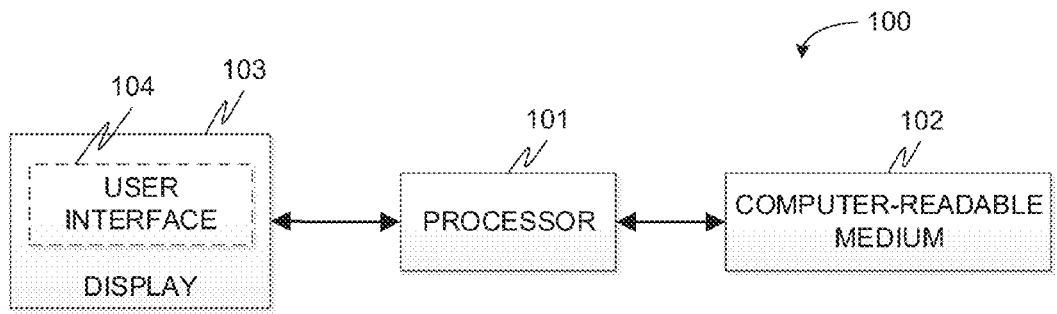
FIG. 1 is a block diagram of an exemplary system for transforming an information technology (IT) infrastructure in accordance with some embodiments of the present disclosure.

Referring now to FIG. 1, an exemplary system 100 for transforming an information technology (IT) infrastructure is illustrated in accordance with some embodiments of the present disclosure. In particular, the system 100 implements a transformation engine for transforming the IT infrastructure. The transformation engine gathers information on various components of the IT infrastructure and from various stakeholders, assesses a current maturity level of the IT infrastructure using an analytical maturity level, derives a transformation roadmap to achieve a desired maturity level of the IT infrastructure, and provides the transformation roadmap to a business user. The system 100 comprises one or more processors 101, a computer-readable medium (e.g., a memory) 102, and a display 103. The computer-readable medium 102 stores instructions that, when executed by the one or more processors 101, cause the one or more processors 101 to perform transformation of the IT infrastructure in accordance with aspects of the present disclosure. The system 100 interacts with users via a user interface 104 accessible to the users via the display 103.

Figure 2:
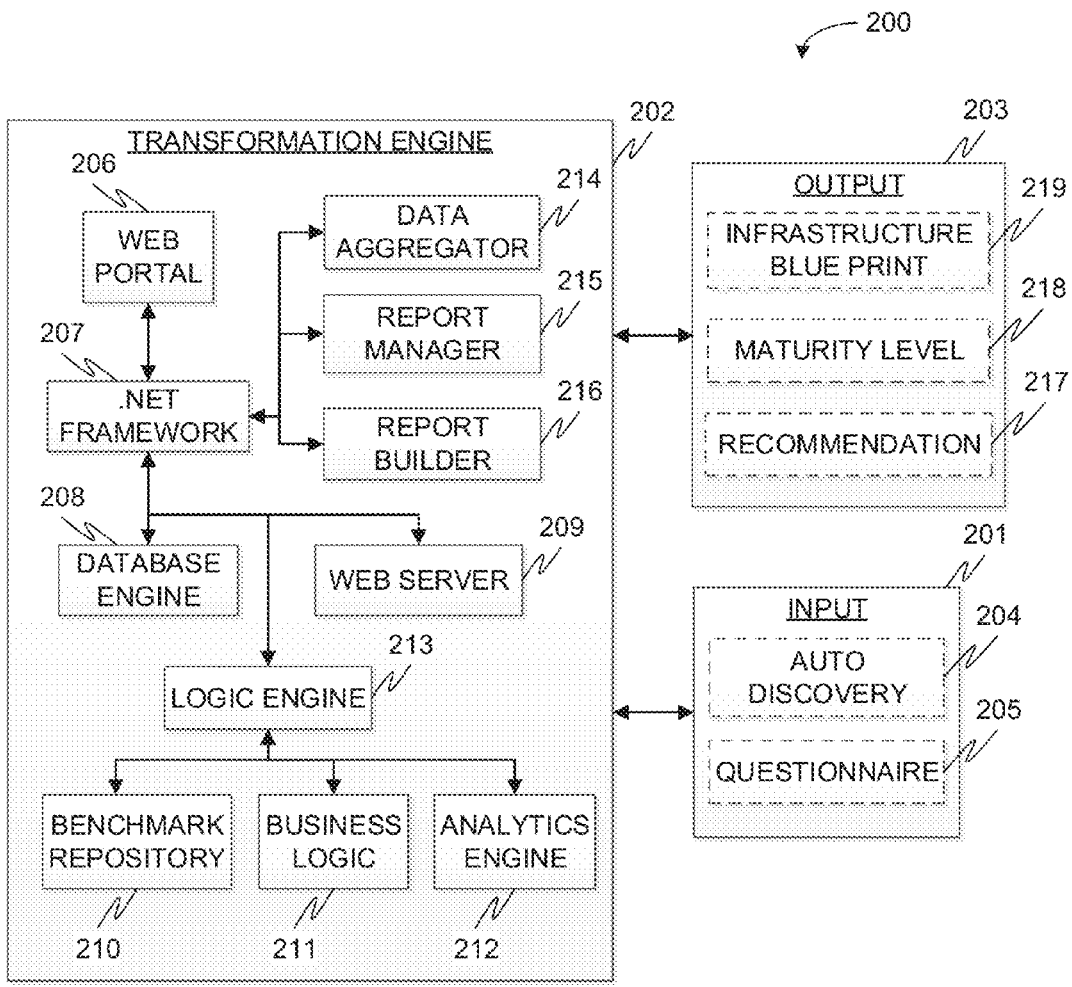
FIG. 2 is a functional block diagram of a transformation engine in accordance with some embodiments of the present disclosure.

Referring now to FIG. 2, a functional block diagram of the transformation system 200 implemented by the system 100 of FIG. 1 is illustrated in accordance with some embodiments of the present disclosure. In some embodiments, transformation system 200 comprises an input module 201, a transformation engine 202, and output modules 203 configured to perform specific functions. The input modules 201 may include at least one of an auto-discovery module 204 and a questionnaire module 205 configured to gather information from various sources such as from the IT infrastructure components, stakeholders, users, and so forth. The auto-discovery module 204 gathers information using auto discovery mechanism and may employ agent based or agent less discovery engines for parsing multiple data sources and gathering information. For example, HP universal discovery software may be employed that automates inventory discovery and dependency mapping. The questionnaire module 205 gathers information from stakeholders manually through the use of pre-built templates and questionnaires. It should be noted that the pre-built templates or questionnaires for manual data collection may be employed to plug any gaps in information gathering using auto-discovery. Further, it should be noted that questionnaire module 205 may decide which template or questionnaire to be employed for manual data gathering based on what data was gathered using auto discovery.

The IT infrastructure comprises one or more of a hardware component, an operating system, a software component, a business application, and so forth. Additionally, the information comprises an inventory of the IT infrastructure, a performance data of each component of the IT infrastructure, a policy with respect to the IT infrastructure, a standard operating procedure of the IT infrastructure, an architecture of the IT infrastructure, operational expenditures around hardware support, license cost, maintenance cost, and other costs involved in driving new IT projects, surveys of stakeholders managing the IT infrastructure, dependencies among multiple components of the IT infrastructure, and so forth.

In accordance with aspects of the present disclosure, the transformation engine 202 includes a web portal 206 build over a software framework such as a .NET framework 207. The web portal 206 receives data via the input module 201. The transformation engine 202 further includes a database engine 208 communicably coupled to the web portal 206 and adapted to store the received data. It should be noted that the database engine 208 stores the data with different attributes which may be leveraged by the transformation engine 202 to perform auto sanitization and run specific analytical calculations. Additionally, the transformation engine 202 includes a webserver 209 that may be integrated with the local domain or that may be in a standalone mode. The webserver 209 is configured to carry out user authentication and/or role based provisioning/audit logging. The webserver 209 may also allow logging into the portal from an external location, thereby enabling centralized control.

The transformation engine 202 further includes several information processing modules such as a benchmark repository module 210, a business logic module 211, an analytics engine 212, and a logical engine 213. In accordance with aspects of the present disclosure, the benchmark repository module 210 benchmarks the internal as well as external data which is stored in the database 208. The benchmark repository module 210 may be regularly updated by the database 208 which in turn receives internal data feeds from the input module 201. Further, the benchmark module 210 receives data feeds from the database 208 which in turn receives external industry benchmark data from a data aggregator 214. It should be noted that the data aggregator 214 is adapted to collect external data feeds from product vendors, consulting agencies, nonprofit organizations, and so forth. The business logic module 211 is adapted to receive data from the input module 201, validate the data with predefined business logics, and provide inputs to the logic engine 213. The business logic module 211 is incorporated with industry specific data across multiple verticals, regions, business units, and so forth. The analytics engine 212 is adapted to validate the data that has been benchmarked by the benchmark repository module 210 against the business logic from the business logic module 211 and provide a maturity rating for the to-be analyzed IT infrastructure areas. The analytics engine 212 is configured with rules and weightages to derive the maturity rating for the input data received from input module 201, to compare the same with data from benchmark repository module 210, and to apply the business logic from the business logic module 211. The analytics engine 212 is therefore adapted to leverage benchmarked data and derive the rating for each infrastructure component. The logic engine 213 comprises of rules and weightages which are used to cumulate the rating provided for each infrastructure components by the analytics engine 212 and derive the overall maturity rating for the IT Infrastructure.

The processed data from the processing modules in general and the logic engine 213 in particular is sent to a data aggregator 214. The data aggregator receives data feeds from the logic engine 213, the input module 201 as well as external benchmark data feeds and provides data to the output module 203. Further, the transformation engine 202 also includes a report manager 215 that is adapted to generate reports of the infrastructure using database engine 208 and provide feeds to a report builder 216. The report builder 216 is adapted to develop and present various graphs, dashboards, and reports in multiple formats. The transformation engine 202 sends the report to the output module 203 which is adapted to display the reports and provide recommendations 217 based on the analysis performed. The recommendations 217 are based on the maturity rating identified for standardization, consolidation, modernization, security and compliance adherence of the IT Infrastructure. It is further adapted to display the maturity ratings 218 of the infrastructure and provide a roadmap of the infrastructure blueprint 219 based on the recommendations 217. The infrastructure blueprint 219 provides in depth view of the current IT landscape.

It should be noted that the transformation system 200 may be implemented in programmable hardware devices such as programmable gate arrays, programmable array logic, programmable logic devices, and so forth. Alternatively, the transformation system 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for transforming an IT infrastructure. For example, the exemplary system 100 and the associated transformation system 200 may manage transformation of the IT infrastructure by the processes discussed herein. In particular, as will be appreciated by those of ordinary skill in the art, control logic and/or automated routines for performing the techniques and steps described herein may be implemented by the system 100 and the associated transformation system 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
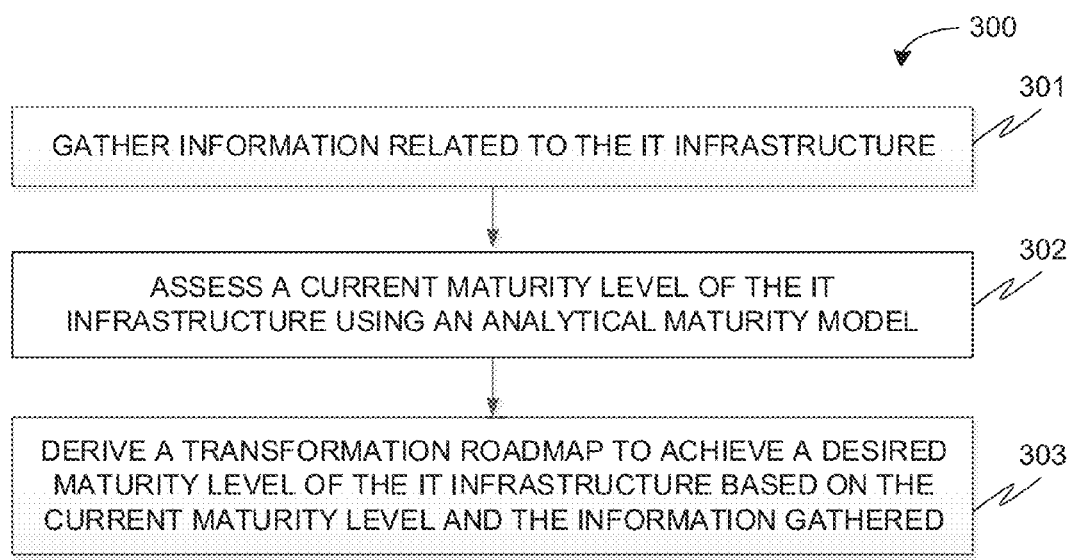
FIG. 3 is a flow diagram of an exemplary process for transforming an IT infrastructure in accordance with some embodiments of the present disclosure.

For example, referring now to FIG. 3, exemplary control logic 300 for transforming an IT infrastructure via a system, such as system 100, is depicted via a flowchart in accordance with some embodiments of the present disclosure. As illustrated in the flowchart, the control logic 300 includes the steps of gathering information related to the IT infrastructure at step 301, assessing a current maturity level of the IT infrastructure using an analytical maturity model at step 302, and deriving a transformation roadmap to achieve a desired maturity level of the IT infrastructure based on the current maturity level and the information gathered at step 303. The analytical maturity model configured to provide maturity ratings based on the information gathered and industry standard. Further, it should be noted that the analytical maturity model is adapted to evaluate and rate a maturity level of each components of the IT infrastructure based on a corresponding industry standard of a similar component. In some embodiments, the control logic 300 further includes the step of providing the transformation roadmap to a business user for transforming the IT infrastructure. Further, in some embodiments, the control logic 300 includes the step of performing analysis to derive insights with respect to the desired maturity level. It should be noted that the transformation roadmap comprises one or more recommendations for implementation with respect to one or more components of the IT infrastructure. Further, it should be noted that the transformation roadmap may also include associated cost and benefit analysis of the transformation.

In some embodiments, gathering information on the IT infrastructure at step 301 further comprises receiving the information from at least one of: one or more sources using automatic discovery algorithms, and one or more stakeholders using pre-defined questionnaires. Additionally, in some embodiments, gathering information on the IT infrastructure at step 301 comprises mapping the information related to multiple components of the IT infrastructure. Further, in some embodiments, gathering information on the IT infrastructure at step 301 comprises validating the information related to the IT infrastructure. Moreover, in some embodiments, gathering information on the IT infrastructure at step 301 comprises consolidating the information into pre-defined templates.

In some embodiments, assessing the current maturity level of the IT infrastructure at step 302 further comprises capturing a current state of the IT infrastructure. Additionally, in some embodiments, assessing the current maturity level of the IT infrastructure at step 302 comprises benchmarking each component of the IT infrastructure against a corresponding industry standard. In some embodiments, deriving the transformation roadmap at step 303 comprises identifying gaps between the current maturity level and the desired maturity level of the IT infrastructure.

Figure 4:
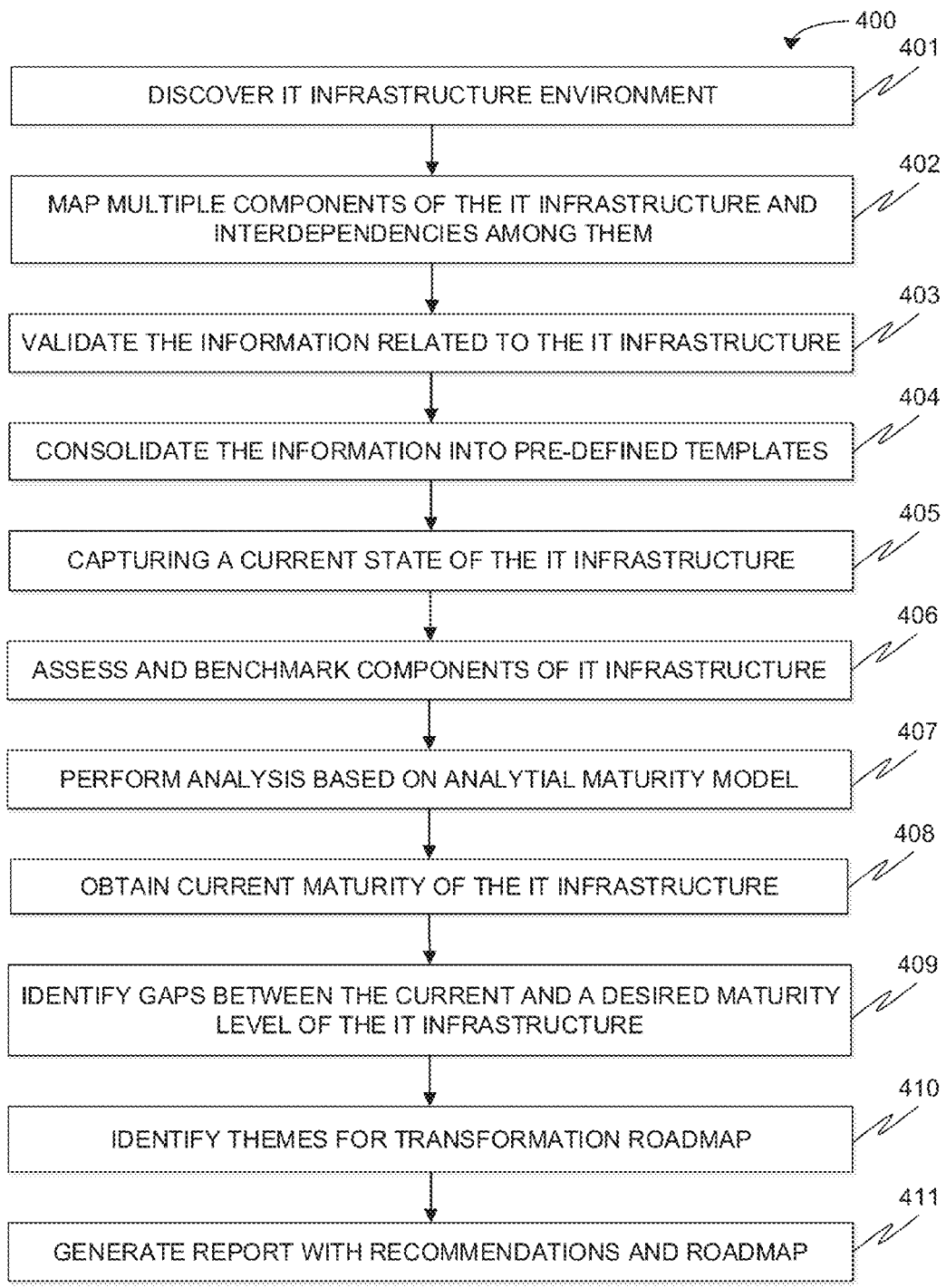
FIG. 4 is a flow diagram of a detailed exemplary process for transforming an IT infrastructure in accordance with some embodiments of the present disclosure.

Referring now to FIG. 4, exemplary control logic 400 for transforming an IT infrastructure is depicted in greater detail via a flowchart in accordance with some embodiments of the present disclosure. As illustrated in the flowchart, the control logic 400 includes the step of discovering the IT infrastructure environment at step 401. As noted above, the IT infrastructure environment includes hardware components, operating system, software components, business applications, and so forth. Discovering the IT infrastructure environment at step 401 typically includes collection of the following data: tool based discovery of IT infrastructure inventory, extract of performance and environment data; IT policies, IT processes, standard operating procedures, network and architectures artifacts, financial data around current operational expenditures, costs involved in driving new IT projects, online questionnaire based interviews with key stakeholders (e.g., system administrators, process owners, architects, IT managers, and so forth), dependencies among multiple components of the IT infrastructure, and so forth.

The control logic 400 further includes the step of mapping of the data related to hardware components, operating system, software components, business applications, and dependencies among them at step 402. For example, mapping at the step 402 may be discovering or deriving what application is hosted on what kind of operating system and on what model of server. Similarly, details of what kind of hypervisor are the operating system hosted on with all the configuration details of the hypervisor stack is mapped. Workload details with capacity and performance statistics are also captured and mapped during this phase.

The control logic 400 further includes the step of validating the information related to the IT infrastructure at step 403. The data is validated for consistencies. It should be noted that the data which is redundant or data which is not providing information about the IT environment is not discarded altogether but given less weightage than relevant data. In other words, the data is sanitized to enable further processing of the same. The control logic 400 further includes the step of consolidating the information into pre-defined templates at step 404. The data may be consolidated into pre-defined inventory templates and utilized for deriving the blueprint of the overall IT Infrastructure, for benchmarking, and for deriving the IT roadmap.

The control logic 400 further includes the step of capturing a current state of the IT infrastructure at step 405. In this step, the as-is state of IT infrastructure environment is derived. The step is repeated for all objects of assessment which includes applications, processes and infrastructure including servers, and so forth. The capturing of as-is state may be done in parallel with necessary joins based on dependencies. The control logic 400 further includes the step of assessing and benchmarking each components of the IT infrastructure at step 406. The assessment and benchmarking of the infrastructure components is typically carried out by the processing modules of the transformation engine described above.

The control logic 400 further includes the step of performing analysis and executing algorithms based on an analytical maturity model at step 407. The analytical maturity model is a standardized, organized, optimized, and smart (SOOS) maturity model and is adapted to evaluate and rate a maturity level of each components of the IT infrastructure based on a corresponding industry standard of a similar component. In other words, the analytical maturity model is used to evaluate and rate a current maturity of the technology platforms adopted by a customer and provide individual technology ratings for areas like computing, storage, network, backup, databases, servers, data centers, and so forth or an overall maturity considering all technology platforms. For example, the analytical maturity model may rate maturity level of storage component of a banking organization or an e-retail organization based on existing benchmark of storage component employed across industry. It should be noted that benchmark may be derived from storage vendor companies, market research companies, consulting companies, nonprofit organizations, and so forth. The benchmarking may include product wise benchmarking, or generic enterprise level benchmarking. Further, in some embodiments, the maturity level may be based on a scale of 1 to 5 or other such scale.

It should be noted that the analytical maturity model may provide maturing rating in a variety of ways. In some embodiments, the analytical maturity model captures inventory data based on predefined technical attributes for each technology platform and uploads the same to a digitized platform. The configuration details and the reasons behind adopting specific configuration are also captured in the digitized platform in form of questionnaire's key questions. The captured information is sanitized and standardized using algorithms and pre-defined scripts for validation against the benchmark data available within the portal. Predefined rules and algorithms linked with the benchmark data may be employed to compare the current state of the technology platform. Each level of the analytical maturity model which is linked to critical technology enablers such as availability, monitoring, performance, security adherence, automation adoption, and so forth may be employed to rank the output derived from the current state. It should be noted that the entire analytical maturity model rating methodology—from the validation and comparison of the current state using the benchmark data to providing the analytical maturity model output as per the predefined technology enablers—is automated using the digitized platform.

The control logic 400 further includes the steps of obtaining current maturity level of the IT infrastructure environment at step 408 based on the analysis at step 407, and identifying gaps between the current and a desired maturity level of the IT infrastructure at step 409. By way of an example, a gap in the existing state of the application may include overutilization of resources, i.e., server, database, storage. In another scenario, a gap in the existing state of the application may include underutilization of resources. In yet another scenario, a gap in the existing state may be non-availability of optimum level of resources, for example, server, storage, and end user computing devices. Recommendations are provided for the gaps identified in the current maturity level in order to reach a desired maturity level. The control logic 400 further includes the step of identifying themes for transformation roadmap at step 410. The themes for transformation roadmap are derived using the infrastructure blueprint or the current state of infrastructure, the analytical maturity model output parameters, and the analytics provided by the analytical engine module. The transformation roadmap may include one or more recommendations for implementation with respect to one or more components of the IT infrastructure. The control logic 400 further includes the step of generating report with recommendations and roadmap for transformation at step 411. The report generated may be presented to the end customers.

It should be noted that the recommendations and roadmap provided is agnostic to various products, solutions or implementations available in the market from multiple vendors. While assessing, the technique analyzes the current technologies used at the IT estate and cross validates it with other available vendors in such technologies. The analysis is done through parameters such as industry benchmarks, internal benchmarks of client or service provider, pricing and budget, performance, operational overheads, ease of platform adoption, pros and cons of continuing with the same technology or switching to a new technology, future technology roadmaps, and so forth. The technique recommends a best fit option to the IT estate in question after performing all such vendor agnostic assessments. For example, the recommendations may be to optimally utilize current IT infrastructure so as to provide savings on operational expense without requiring any capital investment. In another example, the recommendations may be to provide a current level of IT infrastructure vis-à-vis competitor or industry and to suggest improvement along with capital investment requirement while also providing operational savings that can be derived from such investment. In a further example, the recommendations may be suggestions on upfront capital investment vis-à-vis a licensing or a leasing model for the improvement of IT infrastructure. Further, the technique may provide a lot of insights on IT infrastructure transformation with the help of intelligent analytics.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
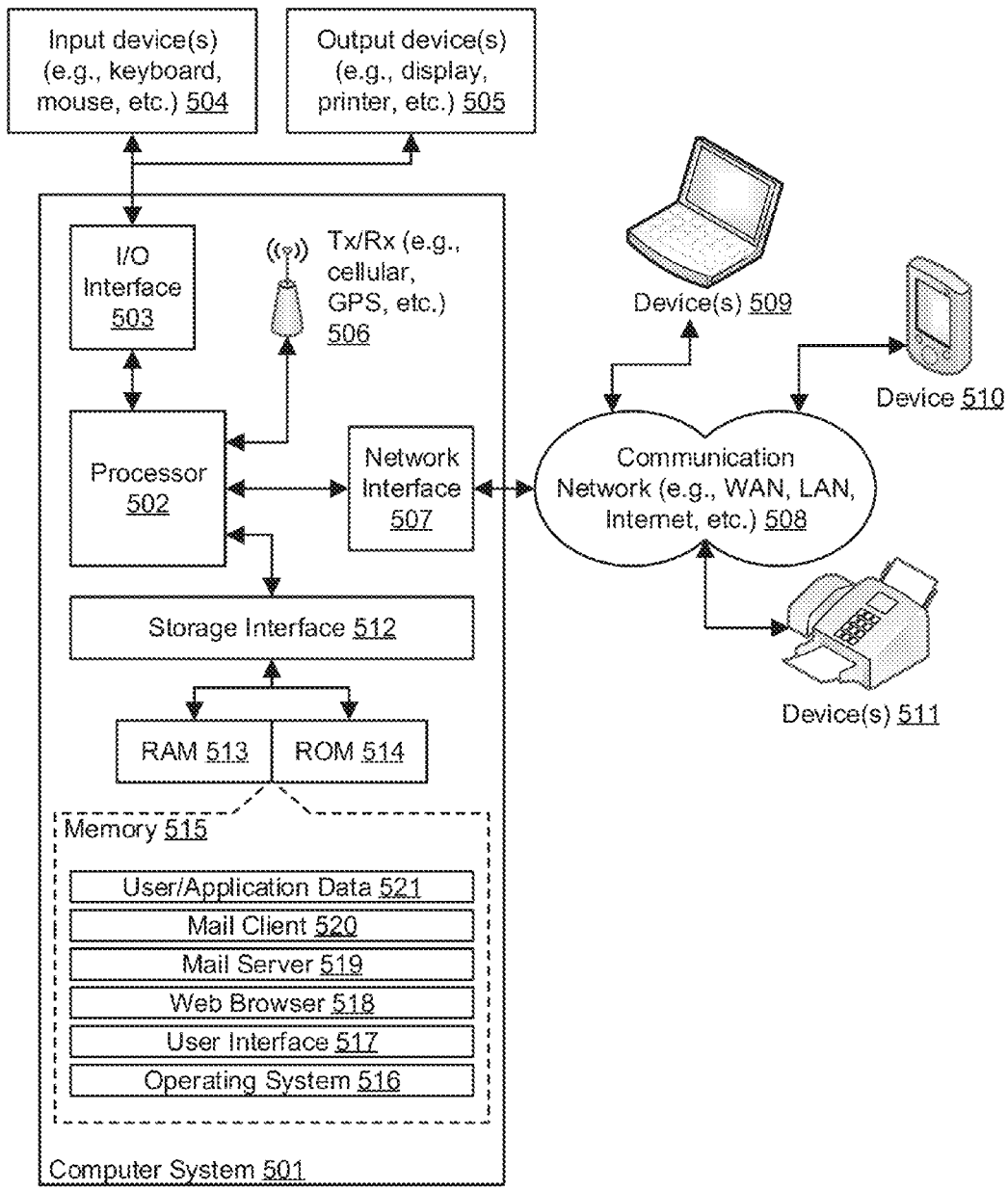
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 and transformation system 200 for transforming an IT infrastructure. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., infrastructure components, information related to infrastructure components, benchmarking data, maturity ratings, infrastructure blueprint, recommendations, roadmaps, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above result in a highly customizable and multi-tenant cloud based platform capable of performing assessments, capturing benchmarks, driving insights with guided roadmaps. The transformation platform discussed in various embodiments discussed above may be used for any type of transformation assessments such as enterprise architecture, infrastructure maturity, applications portfolio rationalization, infrastructure security and so forth. Further, the platform may be leveraged for any domain area such as storage, backup, computing, database, and network in infrastructure and service management areas.

Additionally, the techniques described in embodiments discussed above focus on assessment of the current infrastructure and then build a roadmap of transformation with themes of standardizing, consolidating and modernizing. The assessment is data driven and analytics driven and provides return on investment (ROI) and total cost of ownership (TCO). The discovery of the IT infrastructure environment by employing a combination of auto discovery mechanism and administration of manual questionnaire results in more complete and accurate data gathering.

Further, the analytical maturity model described in the embodiments discussed above provides maturity ratings for the infrastructure components, as well as the overall infrastructure on a scale and not merely label them legacy or not. The analytical maturity model further rates the maturity in technology and process areas. Moreover, the embodiments described above have the capability to rate and benchmark each technology domain and service management areas based on an analytical calculation engine, to provide roadmaps to reduce IT Infrastructure spends, and to provide future ready transformation strategy. The techniques described in embodiments discussed above further provide for digitized templates and charts, thereby enabling building of the right transformation plan for complex IT environments.

The specification has described system and method for IT infrastructure transformation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transforming an information technology (IT) infrastructure, the method comprising:

gathering, via a processor, information related to the IT infrastructure from one or more sources using automatic discovery algorithms, and one or more stakeholders using pre-defined questionnaires;

mapping, via the processor, the gathered information of one or more components of the IT infrastructure with another one or more components of the IT infrastructure based on dependencies among components of the IT infrastructure;

validating, via the processor, the information related to the IT infrastructure upon mapping the gathered information;

consolidating, via the processor, the gathered information into pre-defined templates upon validating the information;

assessing, via the processor, a current maturity level of the IT infrastructure using an analytical maturity model, the analytical maturity model configured to provide maturity ratings based on the consolidated information and industry standard; and deriving, via the processor, a transformation roadmap to achieve a desired maturity level of the IT infrastructure based on the current maturity level and the consolidated information.

2. The method of claim 1, further comprises providing the transformation roadmap to a business user for transforming the IT infrastructure, wherein the transformation roadmap comprises one or more recommendations for implementation with respect to the one or more components of the IT infrastructure.

3. The method of claim 1, wherein the IT infrastructure comprises at least one of a hardware component, an operating system, a software component, and a business application.

4. The method of claim 1, wherein the information related to the IT infrastructure comprises at least one of an inventory of the IT infrastructure, a performance data of each component of the IT infrastructure, a policy with respect to the IT infrastructure, a standard operating procedure of the IT infrastructure, an architecture of the IT infrastructure, a survey of a stakeholder of the IT infrastructure, and dependencies among multiple components of the IT infrastructure.

5. The method of claim 1, wherein assessing the current maturity level of the IT infrastructure further comprises:
    capturing a current state of the IT infrastructure; and
    benchmarking each component of the IT infrastructure against a corresponding industry standard.

6. The method of claim 1, wherein the analytical maturity model is adapted to evaluate and rate a maturity level of each components of the IT infrastructure based on a corresponding industry standard of a similar component.

7. The method of claim 1, wherein deriving comprises identifying gaps between the current maturity level and the desired maturity level of the IT infrastructure.

8. A system for transforming an information technology (IT) infrastructure, the system comprising:
    at least one processor; and
    a computer-readable medium storing instructions that, when executed by the at least one processor, cause the at least one processor to perform operations comprising:
    gathering information related to the IT infrastructure from one or more sources using automatic discovery algorithms, and one or more stakeholders using pre-defined questionnaires;
    mapping the gathered information of one or more components of the IT infrastructure with another one or more components of the IT infrastructure based on dependencies among components of the IT infrastructure;
    validating the information related to the IT infrastructure upon mapping the gathered information;
    consolidating the gathered information into pre-defined templates upon validating the information;
    assessing a current maturity level of the IT infrastructure using an analytical maturity model, the analytical maturity model configured to provide maturity ratings based on the consolidated information and industry standard; and
    deriving a transformation roadmap to achieve a desired maturity level of the IT infrastructure based on the current maturity level and the consolidated information.

9. The system of claim 8, wherein the operations further comprise providing the transformation roadmap to a business user for transforming the IT infrastructure, wherein the transformation roadmap comprises one or more recommendations for implementation with respect to the one or more components of the IT infrastructure.

10. The system of claim 8, wherein the IT infrastructure comprises at least one of a hardware component, an operating system, a software component, and a business application.

11. The system of claim 8, wherein the information related to the IT infrastructure comprises at least one of an inventory of the IT infrastructure, a performance data of each component of the IT infrastructure, a policy with respect to the IT infrastructure, a standard operating procedure of the IT infrastructure, an architecture of the IT infrastructure, a survey of a stakeholder of the IT infrastructure, and dependencies among multiple components of the IT infrastructure.

12. The system of claim 8, wherein assessing the current maturity level of the IT infrastructure further comprises;
    capturing a current state of the IT infrastructure; and
    benchmarking each component of the IT infrastructure against a corresponding industry standard.

13. The system of claim 8, wherein the analytical maturity model is adapted to evaluate and rate a maturity level of each components of the IT infrastructure based on a corresponding industry standard of a similar component.

14. The system of claim 8, wherein deriving comprises identifying gaps between the current maturity level and the desired maturity level of the IT infrastructure.

15. A non-transitory computer-readable medium storing computer-executable instructions for:
    gathering information related to the IT infrastructure from one or more sources using automatic discovery algorithms, and one or more stakeholders using pre-defined questionnaires;
    mapping the gathered information of one or more components of the IT infrastructure with another one or more components of the IT infrastructure based on dependencies among components of the IT infrastructure;
    validating the information related to the IT infrastructure upon mapping the gathered information;
    consolidating the gathered information into pre-defined templates upon validating the information;
    assessing a current maturity level of the IT infrastructure using an analytical maturity model, the analytical maturity model configured to provide maturity ratings based on the consolidated information and industry standard; and
    deriving a transformation roadmap to achieve a desired maturity level of the IT infrastructure based on the current maturity level and the consolidated information.

16. The medium of claim 15, further storing instructions for providing the transformation roadmap to a business user for transforming the IT infrastructure, wherein the transformation roadmap comprises one or more recommendations for implementation with respect to the one or more components of the IT infrastructure.

17. The medium of claim 15, wherein assessing the current maturity level of the IT infrastructure further comprises:
    capturing a current state of the IT infrastructure; and
    benchmarking each component of the IT infrastructure against a corresponding industry standard.

18. The medium of claim 15, wherein deriving comprises identifying gaps between the current maturity level and the desired maturity level of the IT infrastructure.

* * * * *